Dec. 17, 1963　　　F. WELLMAN　　　3,114,208
SLIDE BINDING
Filed Aug. 28, 1961
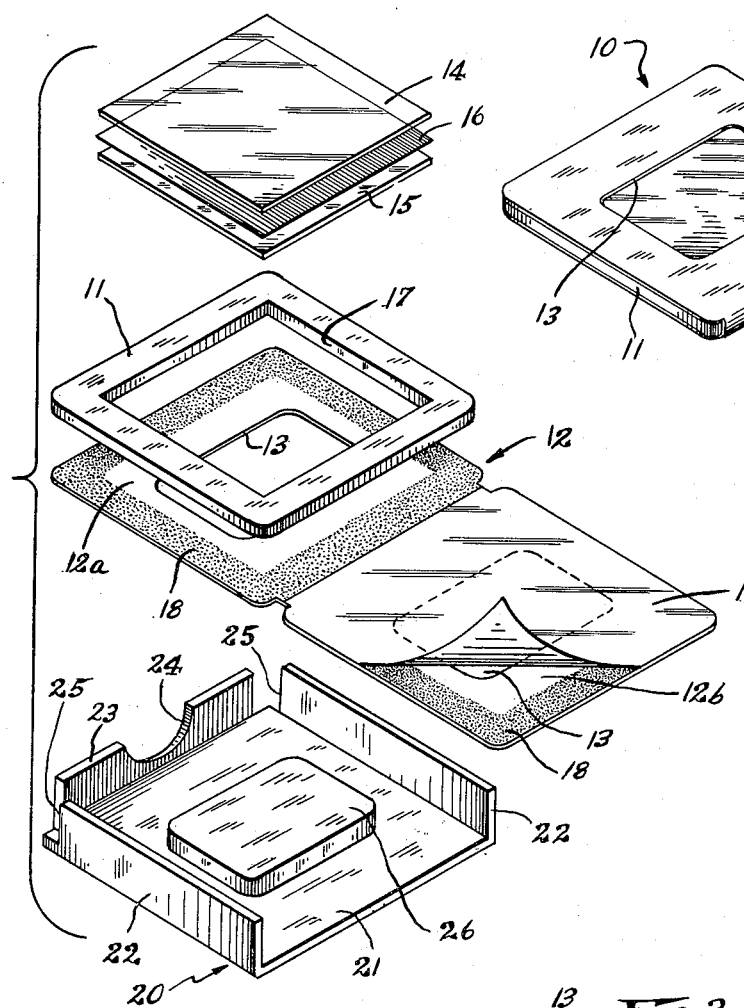
INVENTOR.
FRED WELLMAN,
BY
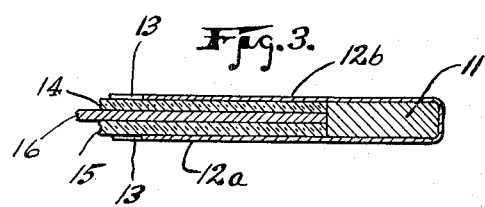
ATTORNEYS.

United States Patent Office 3,114,208
Patented Dec. 17, 1963

3,114,208
SLIDE BINDING
Fred Wellman, 6414 Central Ave., Indianapolis, Ind.
Filed Aug. 28, 1961, Ser. No. 134,344
2 Claims. (Cl. 33—184.5)

This invention relates to slide binders, or mountings adapting photographic films for use in projectors. More particularly, the invention is concerned with binders, and the application of binders, of the type in which the film is protected by being disposed between cover glasses. Binders of this general type are not new with me, but prior binders of which I am aware all possessed certain disadvantages. For example, metal and plastic binders generally provide no seal effectively protecting the film against access of dust and moisture. Binders embodying paper wraps glued in place may provide an adequate seal protecting the film; but the application of such binders presents difficulties in properly aligning apertures in the wrap with the film, in preventing glue from smearing the glass or the film, and in tending to entrap undesirable moisture.

It is therefore an object of this invention to produce a slide binder which will provide an adequately sealed mounting for the film and which can be readily applied without danger of objectionable smearing and without entrapping moisture. Another object of the invention is to insure, in a simple and effective manner, proper alignment of the apertures in the wrap with the film.

A slide binder according to the invention embodies a frame having a central opening adapted to receive the film and the two cover glasses between which the film is disposed. For the frame and the glasses and film it receives, I provide a wrap of paper or like material comprising two similar leaves each apertured appropriately to render the film visible. On one side of the wrap, each leaf thereof is coated along its margin with a pressure sensitive adhesive firmly securing and sealing the two leaves to opposite sides of the frame. For use in assembling the binder, I employ a fixture of a size to receive and locate the frame, and on such fixture I provide a boss properly dimensioned to be received in the aperture of one of the leaves whereby the wrap and frame will be held in proper relative position while being pressed together and united through the adhesive.

In the accompanying drawing:

FIG. 1 is an isometric view of a complete slide;

FIG. 2 is an exploded isometric view showing the elements of the slide and the fixture used in assembling it; and FIG. 3 is a fragmental section through the slide on an enlarged scale.

As will be clear from FIGS. 1 and 2, a completed slide indicated in its entirety by the reference numeral 10, comprises a frame 11 and a wrap 12 of paper or the like apertured at 13 to expose the cover glasses 14 and 15 between which the film 16 is disposed. The frame 11, which is square as shown, has a central opening 17, also shown as square, adapted to receive the cover glasses 14 and 15 and the film 16 between them. The frame 11 may be of cardboard or similar material and has a thickness substantially equal to the aggregate thickness of the cover glasses and film. The wrap 12 has two similar leaves 12a and 12b foldable over each other to be secured to opposite faces of the frame 11.

In accordance with one feature of the present invention, the wrap-leaves 12a and 12b are secured to the frame by a pressure sensitive adhesive 18 applied to one face of the wrap 12 over the peripheral portions of the two wrap-leaves. As produced for use and sale, the adhesive-bearing faces of the two leaves of each wrap are covered with separate flexible backings 19, of known character, which when in place protect the adhesive but which can be readily stripped from the wrap when the latter is to be applied.

Pressure-sensitive adhesives differ from ordinary glues and cements used in securing paper and the like to a base in that it is practically impossible to alter the relative positions of the paper and base after their initial interengagement. Accordingly, it is important that the frame 11 be in proper position relative to the wrap before it is brought into contact with the adhesive 18. To facilitate such proper positioning I employ the fixture 20 shown in FIG. 2. Such fixture has the form of an open-top, three sided shallow box having a bottom 21, opposite side walls 22, and an end wall 23, the latter conveniently being notched intermediately, as shown at 24, to provide a finger opening and spaced at its ends from the side walls, as indicated at 25. The spacing of the side walls 22 is such that a frame 11 may be received between them with a locating fit. Centrally located on the bottom 21 is an upwardly projecting boss 26 shaped and dimensioned to fit the aperture 13 in either of the wrap leaves 12a and 12b.

In assembling a slide, the backing 19 is stripped from one of the wrap-leaves, the leaf 12a as shown, and the wrap is brought into association with the fixture 20 in such a way that the boss 26 projects upwardly through the aperture 13 in the stripped leaf, thus locating the wrap in definite position relative to the fixture. A frame 11 is brought into the fixture and, while disposed in engagement with the end fixture-wall 23, is pressed downwardly into firm contact with the exposed adhesive 18. The frame and wrap, thus secured together in proper relative position, are removed from the fixture, the cover glasses 14 and 15 and the film 16 are positioned in superposed relation in the frame-opening 17, the backing 19 is stripped from wrap-leaf 12b, and such wrap-leaf is folded over and pressed down against the upper surface of the frame to be secured thereto by the adhesive 18.

The use of a pressure-sensitive adhesive to secure the wrap to the frame is especially advantageous where, as contemplated by this invention, the initial joining of the frame and wrap is effected in a locating fixture; for it would be difficult to keep other types of adhesives, such as glues and cements from accumulating on the fixture. Further contributing to keeping the fixture clean are the spaces 25 between the end and side walls. Such openings inhibit the collection of dust or other foreign matter in the corners of the fixture. In this connection, it may be noted that any accumulation of foreign matter on the fixture could interfere with proper reception of the frame or result in bending of the frame when pressure is applied to it to bring it into firm contact with the adhesive 18.

If, as is preferred, the band 18 of pressure-sensitive adhesive on each wrap-leaf is wide enough to extend inwardly beyond the edges of the opening 17 in the frame 11, the adhesive will be in contact with the cover glasses to form a continuous seal around the apertures 13, thus providing a completely sealed enclosure for the film.

I claim as my invention:

1. For use in assembling a photographic slide mounting including a wrap comprising two leaves each having a central aperture and being coated peripherally on one side with a pressure-sensitive adhesive, a box-like fixture having a bottom, two opposite parallel side walls, and one end wall, said side walls being spaced apart to receive between them and locate relatively to each other one leaf of said wrap and a frame to be secured thereto, said bottom having an upwardly projecting boss positioned and dimensioned to be received in the aperture of the wrap-leaf within the box.

2. A fixture as set forth in claim 1 with the addition that the adjacent ends of the side and end walls are spaced apart at corners of the fixture bottom.

References Cited in the file of this patent

UNITED STATES PATENTS

| | | |
|---|---|---|
| 2,684,537 | Rosie | July 27, 1954 |
| 2,739,401 | Balter | Mar. 27, 1956 |
| 2,793,442 | Ozga | May 28, 1957 |
| 2,842,883 | Folwell | July 15, 1958 |